United States Patent

Barnett

[15] 3,635,534
[45] Jan. 18, 1972

[54] SELF-PRESSURIZING BEARINGS WITH RESILIENT ELEMENTS

[72] Inventor: Morris A. Barnett, Palos Verdes Estates, Calif.

[73] Assignee: The Garrett Corporation

[22] Filed: Aug. 6, 1969

[21] Appl. No.: 848,053

[52] U.S. Cl. ............................................308/121, 308/160
[51] Int. Cl. .................................F16c 17/03, F16c 17/06
[58] Field of Search ............................................308/160, 73

[56] References Cited

UNITED STATES PATENTS

| | | | |
|---|---|---|---|
| 1,494,010 | 5/1924 | Newhouse | 308/160 |
| 2,306,048 | 12/1942 | Fast | 308/73 |
| 3,382,014 | 5/1968 | Marley | 308/73 |
| 3,434,761 | 3/1969 | Marley | 308/9 |
| 3,511,544 | 5/1970 | Marley | 308/5 |
| 3,495,886 | 2/1970 | Roberts et al. | 308/163 |

*Primary Examiner*—Martin P. Schwadron
*Assistant Examiner*—Frank Susko
*Attorney*—Fraser and Bogucki, John N. Hazelwood and Albert J. Miller

[57] ABSTRACT

A hydrodynamic fluid bearing is disclosed having a deflectable resilient bearing element within the spacing formed between the movable and stationary portions of the bearing. Additionally, resilient bearing stiffeners are positioned immediately adjacent the bearing element for changing in a predetermined way the deflection response of the bearing element. In order to initiate bearing element deformation a groove is formed in the bearing element. Deformation of the bearing element is controlled by support elements positioned between the resilient bearing element and the stationary portion of the bearing.

21 Claims, 16 Drawing Figures

DEFORMATION OF BEARING

PRESSURE PROFILE

DEFORMATION OF BEARING

INVENTOR.
MORRIS A. BARNETT
BY
ATTORNEYS

INVENTOR
MORRIS A. BARNETT

ATTORNEYS

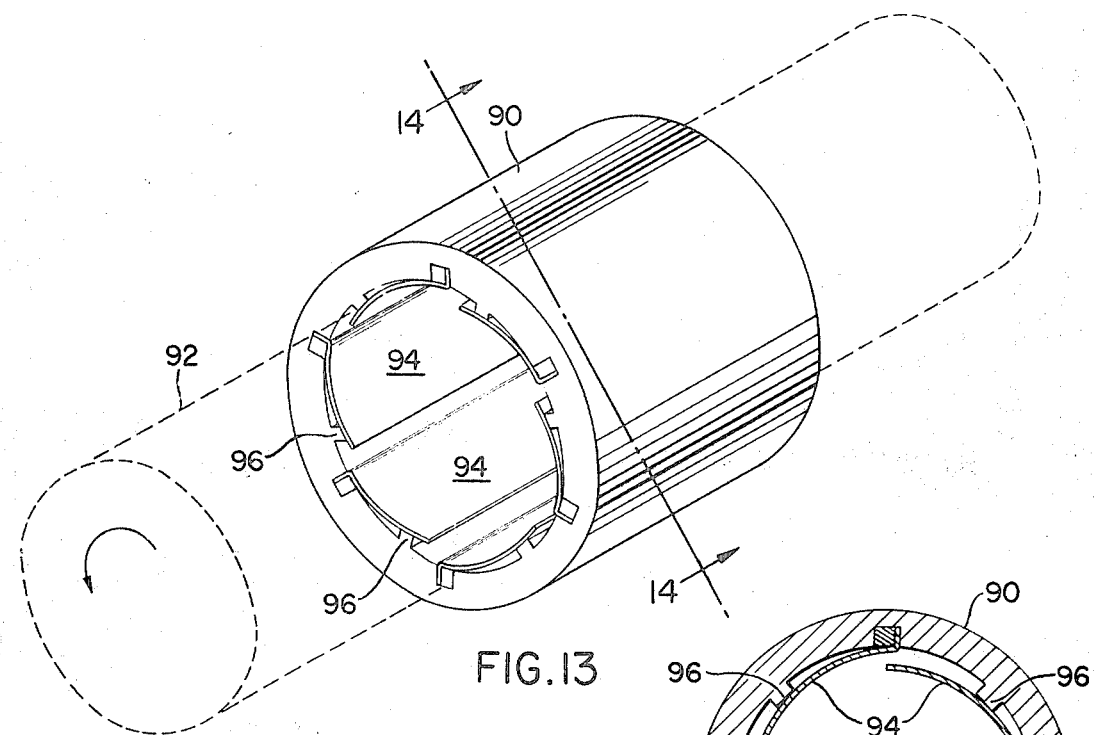
FIG. 13
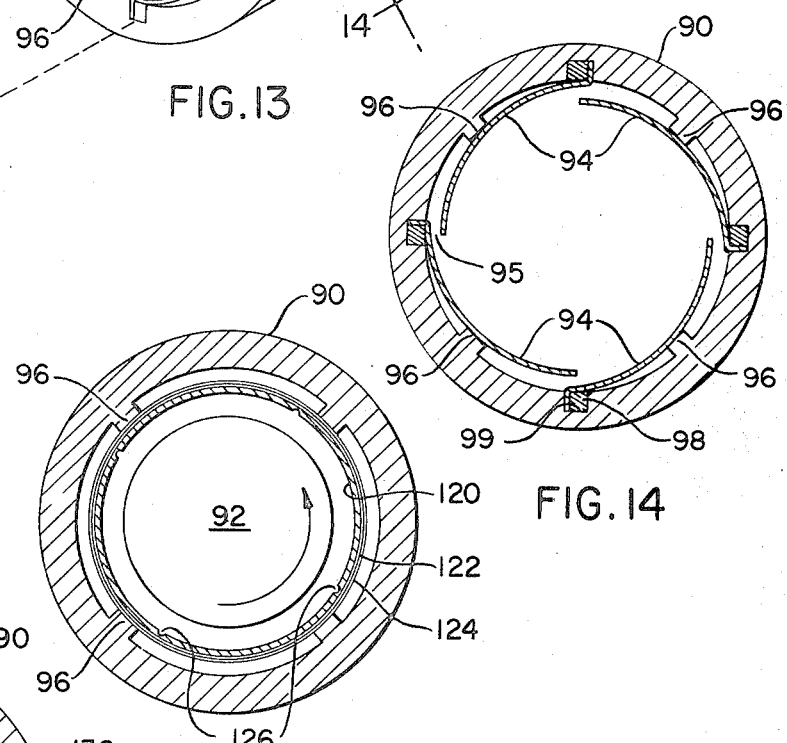
FIG. 14
FIG. 15
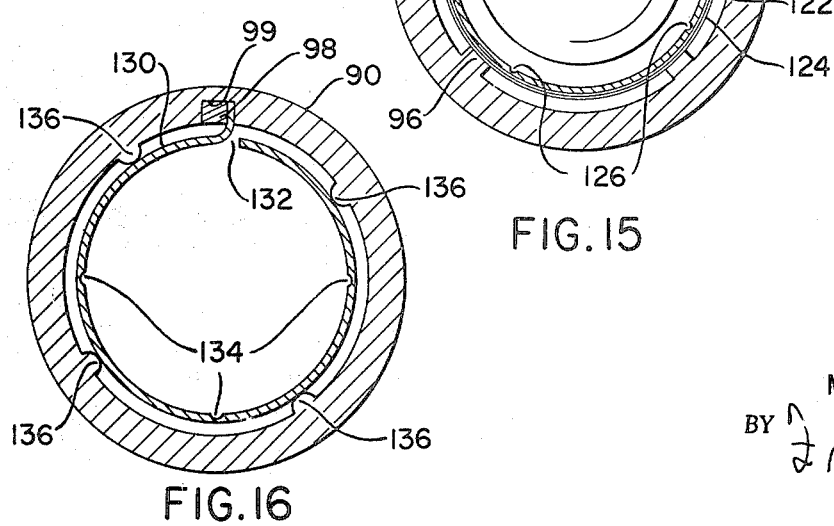
FIG. 16
INVENTOR.
MORRIS A. BARNETT
BY Fraser and Bogucki
ATTORNEYS

SELF-PRESSURIZING BEARINGS WITH RESILIENT ELEMENTS

BACKGROUND OF THE INVENTION

1. Field of the Invention

This invention relates generally to self-pressurizing foil bearings for rotating machinery, and more particularly to such bearings having resilient elements to develop a load-supporting fluid film and provide controlled bearing characteristics.

2. Description of the Prior Art

One type of bearing which has aroused considerable interest in recent years, particularly for extremely high-speed rotating machinery, has been the hydrodynamic foil bearing, sometimes referred to simply as a fluid foil bearing. Strictly speaking, hydrodynamic bearings are self-acting or self-pressurizing bearings in which the relative movement of a rotating shaft-and-bush combination develops viscous shear which draws a fluid lubricant in between the bearing surfaces to provide the desired lubrication. It should be noted that such bearings may be designed to use either a liquid or a gaseous lubricant. However, air is commonly used as a lubricant in such bearings particularly where extreme high speed is involved, and, for simplicity, the present invention will be described herein primarily in connection with the use of a gaseous lubricant, such as air or some other suitable gas. In many configurations, the use of one or more foils (i.e., thin metal sheets) extending about the rotating shaft member provides an improved type of high-speed bearing. Foil gas bearings per se are inherently subject to a number of problems with respect to various types of instabilities which are likely to develop at various rotational speeds. Such problems are discussed, along with various configurations of gas-lubricated foil bearings of the prior art, in an article entitled "Some Instabilities and Operating Characteristics of High-Speed Gas-Lubricated Journal Bearings," by K. Fischer et al., ASME Paper 58A-231. Although the article discusses various problems mainly relating to limitations on high-speed bearing operation, it fails to point to any ready solution to these problems, nor does it treat the problems which are encountered in operating gas bearings at low speeds such as are encountered during startup and coast down or in starting from rest condition (zero r.p.m.). Proper control or elimination of high-speed instabilities will permit the bearing to operate to the burst speed of the rotating assembly, sometimes approaching a speed of 1,000,000 r.p.m. or more.

Fluid film lubricated bearings are used extensively today because of the need for a bearing to match very high speed rotary-type equipment. However, while fluid film lubricated-type bearings may often be used where other types of bearings cannot be, certain unique problems exist with fluid film bearings, such as the need for extremely high accuracy and precision during manufacture and the problem of inherent instabilities with hydrodynamic bearings. There are two principal types of instability, the first of which is known as "synchronous whirl" and the second of which is known as "half-speed whirl."

A hydrodynamic bearing comprises a stationary element such as a bushing (in a journal bearing) and a rotatable element such as a shaft which is positioned within the bushing and closely spaced from the bushing's interior wall. Under theoretical no-load conditions the shaft will rotate about its longitudinal axis which will coincide with the geometric center of the bushing. However, under actual load conditions the shaft's geometric center of longitudinal axis is not coincident with the geometric center of the bushing. During rotation the geometric center of the shaft tends to orbit about the geometric center of the bushing so that the outer surface of the shaft is at times positioned very close to the interior wall of the bushing. This eccentric dynamic positioning of the bushing and shaft causes a converging wedge of high-pressure fluid in the spacing immediately forward (i.e., in the direction of rotation of the shaft) of the nearest location of the shaft to the bushing. Meanwhile, immediately rearward of the nearest location of the shaft to the bushing is a low-pressure divergent zone. Since fluid tends to flow from a high-pressure zone to a low-pressure zone, there is a leakage or squeezing of the fluid between the shaft and the bushing at the location where the shaft is nearest the bushing; the leakage creates the supporting fluid film to prevent the shaft from contacting the bushing.

During relatively low-speed rotation of the shaft, the orbiting motion of the geometric center of the shaft about the geometric center of the bushing tends to set up centrifugal forces acting on the shaft which cause the shaft to orbit or whirl at a rotational speed equal to the rotational speed of the shaft about its own axis. This orbiting or whirling motion is synchronous whirl and occurs at the lowest critical speed of the bearing. Synchronous whirl is not an insuperable problem since the fluid film created as mentioned in the preceding paragraph imposes a dampening and cushioning effect on the shaft to resist contact of the shaft with the bushing. Furthermore, even if the shaft should have a sufficient orbital amplitude to contact the bushing, damage is likely to be minimal since the shaft is not yet rotating at high speed.

Half-speed whirl is a more serious instability which occurs as the shaft approaches a speed approximately equal to twice its lowest critical speed. At twice critical speed the shaft inherently tends to undergo harmonic vibration at its lowest critical frequency. This harmonic vibration is superimposed upon the synchronous whirl and is stimulated or excited by the rotating fluid wedge whose average velocity about the shaft now approaches the lowest critical speed. As a result, the excursions of the shaft rapidly increase in amplitude. During half-speed whirl the whirl velocity of the shaft approximates the average velocity of the fluid wedge. When this occurs the speed of the fluid wedge relative to the orbiting of the shaft tends toward zero, causing a loss to the shaft of fluid film support. Since the shaft is operating at a relatively high speed, contact between the shaft and bushing may cause damage or failure of the bearing.

An excellent method of controlling the instabilities mentioned above is disclosed in U.S. Pat. Nos. 3,215,479 and 3,215,480 entitled "Hydrodynamic Shaft Bearing" and "Hydrodynamic Foil Bearings with Bearing Foil Retaining Means" respectively. The patents disclose the use of a resilient bearing foil adjacent the shaft. Being resilient, the foil accommodates the orbital excursions of the shaft, providing a cushioning and dampening effect which has been found to greatly reduce half-speed whirl instability. However, the above-mentioned patents do not offer a complete solution to the various problems of hydrodynamic bearings since there is still a need for greater load-handling capacities and for a bearing which compensates for misalignment between the movable and stationary elements. Additionally, thermal distortion of the movable element, especially in thrust-type bearings, has been found to be bothersome; thermal distortion is due to the surface of the movable element nearest the stationary element heating very quickly while the remainder of the movable element remains relatively cool. The temperature gradient imposed tends to distort the supposedly flat or uniform surface of the movable element. Finally, it is desirable to control the fluid film instability to an even greater extent than is possible by the arrangements of the above-mentioned patents.

It is, therefore, a general object of the present invention to provide an improved fluid foil bearing arrangement.

A more particular object of the present invention is to provide a foil bearing having increased load capacity.

Another object of the present invention is to provide a fluid foil bearing having increased load capacity at lower rotational velocities.

A specific object of the present invention is to provide a foil bearing structure which is adaptable to controlled variation of the bearing characteristics.

SUMMARY OF THE INVENTION

In brief, the present invention provides fluid bearing structures having a resilient sheet or foil assembly positioned between the two relatively rotatable bearing elements for enhancing the hydrodynamic development of the fluid wedge for supporting the bearing load. The foil assembly so provided is deformable in response to the local pressures generated by the formation of the fluid wedge. A support structure is provided backing up the foil assembly to assist in developing a preferred pressure distribution over the extent of the load-supporting fluid wedge and to control bearing stiffness to the degree desired. Bearing stiffness may be further controlled by the interposition of specific stiffening elements behind or adjacent to the foil assembly and by employing a bearing having bending stiffness. Furthermore, in accordance with an aspect of the invention, the foil assembly may include one or more regularly spaced trough-shaped depressions for the purpose of triggering the development of the pressurized fluid wedge under hydrodynamic conditions in particular locations relative to the support structure so as to achieve an improved fluid pressure distribution for supporting the bearing load at lower operating speeds.

One particular arrangement in accordance with the present invention comprises a thrust type of bearing including a rotatable thrust runner positioned or supported by a stationary mounting plate with a bearing foil assembly and support structure in between. The bearing foil assembly comprises a backing plate having a plurality of foil segments affixed thereto adjacent the thrust runner. The adjacent foil segments are separated by a narrow slot or depression which serves to enhance the development of the fluid wedge under hydrodynamic conditions. In operation, the bearing assembly is subject to deformation in accordance with the pressure distribution of the hydrodynamically developed fluid wedges. This deformation is selectively controlled by the provision of a backing spring preferably located adjacent the mounting plate. One or more stiffening shims are positioned behind the bearing structure relative to the thrust runner and against the rearward face of the foil support plate to control the extent of deformation of the bearing assembly.

Another particular arrangement in accordance with the invention comprises a journal-type of bearing having a rotatable shaft mounted within the opening of a stationary bushing. Between the shaft and the interior surface of the bushing is positioned a foil-bearing structure having along the interior thereof (adjacent the shaft) one or more suitably spaced and positioned longitudinal notches or depressions for assisting in the development of the fluid wedge under hydrodynamic conditions. Between the foil element and the bushing are a plurality of spaced supports which, together with the triggering depressions, control the pressure distribution of the fluid which is pressurized hydrodynamically to support the bearing load. The positioning of the supports in accordance with the invention serves to develop the desired pressure distribution of the load-supporting fluid in a manner which improves the load-supporting characteristics of the bearing. In accordance with an aspect of the invention, the depressions for triggering the development of the fluid wedge may be in the form of troughs or recesses in a continuous bearing foil member or they may be the discontinuities developed by the overlap of a series of bearing foils constituting the bearing assembly. In one particular embodiment of the invention, a stiffening element is provided in the form of a continuous cylinder situated between the bearing foil assembly and the bearing supports. This serves to provide additional control of the pressure distribution in the supporting fluid, particularly where the bearing is under extreme load, so as to stiffen the bearing characteristics and assist in preventing bearing failure.

In still another particular arrangement in accordance with the invention, a bearing is utilized comprising a material having controlled bearing stiffness. Thus a bearing assembly is provided which includes in one integral unit the various elements described in the above-mentioned arrangements. This bearing may be developed for use in thrust or journal bearings as desired and preferably includes selectively spaced troughs or recesses as a means of triggering bearing deformation. A bearing support structure as already described is also employed in this arrangement to develop the desired pressure distribution of the load-supporting fluid.

BRIEF DESCRIPTION OF THE DRAWINGS

A better understanding of the present invention may be had from a consideration of the following detailed description, taken in conjunction with the accompanying drawings, in which:

FIG. 13 is a perspective view of one particular arrangement in accordance with the invention as embodied in a journal-type bearing;

FIG. 14 is a sectional view of the arrangement shown in FIG. 13 taken along the line 14-14 and looking in the direction of the arrows;

FIG. 15 is a sectional view corresponding to FIG. 14 but showing an alternative configuration of arrangements in accordance with the invention; and FIG. 16 is a sectional view also corresponding to FIG. 14 but showing a second alternative configuration of arrangements in accordance with the invention.

DESCRIPTION OF THE PREFERRED EMBODIMENTS

Figure 1:
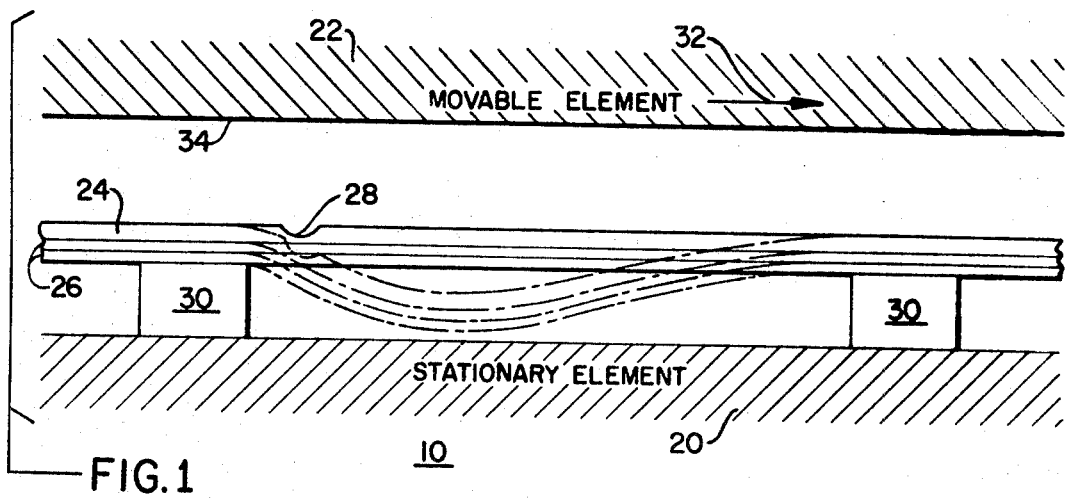
FIG. 1 is a diagrammatic view illustrating a portion of one particular arrangement in accordance with the present invention in both a static position and in exaggerated dynamic position (shown in phantom lines)

Referring to FIG. 1 there are illustrated diagrammatically a stationary element 20 and a corresponding movable element 22 of a bearing 10. These two elements are common to all bearings whether they be of the thrust, journal, linear or other type of bearing, and the invention herein is applicable to all of the various types of bearings. As examples, for bearings of the journal type, the stationary element 20 is a supporting bushing while the movable element 22 is a rotatable shaft; for bearings of the thrust type, the stationary element 20 is a supporting mount while the movable element 22 is a circular runner. The objective of a hydrodynamic bearing, of course, is to provide support of an element while allowing relative motion between that element and a fixed element and to prevent the elements from contacting each other or at least from coming into contact in such a fashion that there is a failure of the system, i.e., relative motion becomes exceedingly difficult or impossible.

As is the case in all hydrodynamic bearings, there is a spacing between the movable and stationary elements where a sufficient pressure must exist if the two elements are to remain separated. While that pressure may be created by a liquid located between the elements, a more likely fluid to exist between the elements is a gas such as air. As disclosed in the above-mentioned patent, advances in the bearing art have included the placement of a resilient bearing element 24 or bearing foil in the spacing. A bearing foil as used in the specification is defined as a relatively thin flexible bearing element or strip whose thickness relative to its other dimensions is such that it may be locally deflected by the hydrodynamic fluid film created between the stationary and movable elements of the bearing.

In addition to the resilient bearing element 24, it has been found that a more adaptable and versatile bearing can be achieved by the addition of a resilient bearing stiffener 26 which is located immediately adjacent the resilient bearing element. As shown in FIG. 1, the resilient stiffener 26 may comprise two foillike layers or laminates. The advantage of a laminated stiffener is that fine control can be achieved over the stiffness of the resilient bearing element, and also there is reduced sensitivity to local defects. Since one laminate can move or slip relative an adjacent laminate and the resilient bearing element, the amount of force or pressure required for deflection is lessened. Thus control is achieved by bringing together the required number of laminates; adding or deleting a laminate changes the deflection response a small increment. Additionally the same bearing may be easily adjusted if the initial design calculations proved incorrect or if different loads are applied or different operating speeds encountered than initially expected. The stiffener 26 may be of any suitable material, such as the same material as the resilient bearing element. The thickness of the stiffeners may be predetermined and may be of any convenient dimension; the determining factor is the predetermined deflection desired under the expected load and operating conditions. With suitable design considerations it is possible to achieve a similar result by providing a resilient bearing element demonstrating controlled bearing stiffness. Under appropriate fabrication conditions, a single bearing assembly incorporating a bearing with controlled bending stiffness and a support structure in an integral unit is preferred as a simpler mechanical member. Such assemblies can be fabricated to provide varying degrees of stiffness within a predetermined range so that one may be substituted readily for another in a bearing configuration to accommodate various imposed loads.

Another major advantage of the present invention is achieved by the addition of a deflection depression 28 such as a groove which acts to initiate or trigger the deflection of the resilient bearing-stiffener combination. It is desirable that the groove be as narrow as possible to not interfere with the wedge of high-pressure gas which it initiates. The deflection depression or trigger 28 concentrates pressure in a very localized region so as to provide rapid response to an increasing pressure as occurs with the approach of the high-pressure wedge. It is to be noted that the deflection depression may be a groove in the resilient bearing element as shown in FIG. 1 or may be a zone formed between two adjacent segments of a resilient bearing element as shown in FIG. 2 and explained hereinafter.

As shown in FIG. 1, the present invention also contemplates the addition of spaced support elements 30 which separate the stationary element 20 from the resilient bearing 24 and the stiffener 26 at selected points. The support element 30 may be rigid or resilient though the latter has been found desirable because it can add greater versatility to the entire bearing system. The support is elongated, extending substantially most of the width of the resilient bearing element 24. The resilient bearing element is thus resilient along its transverse dimension as well as resilient along the direction of relative motion.

One particular bearing configuration in accordance with the invention comprises the stationary and movable elements 20 and 22 respectively, the resilient bearing element 24, the bearing stiffener 26 which may consist of one or more layers of sheet material, the deflection trigger 28 and the support elements 30 as shown in FIG. 1. The FIG. 1 view in solid lines illustrates the bearing configuration under a static condition; however, with the movable element 22 moving in the direction of the arrow 32, a hydrodynamic wedge-shaped concentration of gas is formed which causes a localized deflection of the resilient bearing element 24 and stiffeners 26. Such a deflection is shown in an exaggerated fashion by the phantom lines in FIG. 1 for illustrative purposes. It is to be understood that FIG. 1 is not drawn to any scale but has been spaced and dimensioned so as to clearly show the inventive concepts in sufficient detail. Nevertheless, it is clear that the bearing shown in FIG. 1 has the advantage of not requiring extremely critical tolerances between the movable element 22 and the stationary element 20 since more or less deflection of the resilient bearing element is tolerable without impairing the effectiveness of the bearing. This configuration also has the ability to compensate for slight misalignment between the movable and stationary elements and thus the ability to handle thermal distortions which may occur at a surface 34 of the movable element 22 under high-speed operating conditions. Bearing structures in accordance with the invention also exhibit an improved versatility and control over the instabilities inherent in hydrodynamic journal bearings by virtue of the controlled flexing of the resilient bearing stiffener 26 and bearing foil 28 to provide the proper damping under such conditions as synchronous and half-speed whirl.

Figure 2:
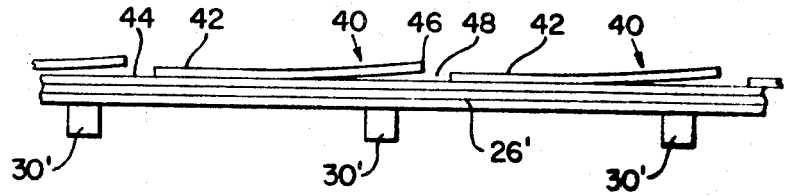
FIG. 2 is a diagrammatic view similar to that of FIG. 1 and illustrates a portion of a second particular arrangement in accordance with the present invention.

Referring now to FIG. 2, there is illustrated another particular arrangement of the elements located within the spacing between the movable and stationary elements of a bearing in accordance with the invention. In FIG. 2 the support elements 30' and bearing stiffener 26' are analogous to the corresponding elements 30 and 26 respectively in FIG. 1. However, instead of having a one-piece resilient bearing element 24 as shown in FIG. 1, the FIG. 2 embodiment is comprised of a number of resilient bearing foils 40, each of which is attached near or at one of its end portions, designated generally 42, to a backing plate 44. The other end portions 46 opposite the attached end portions 42 are adjacent but not attached to the backing plate 44. The resilient bearing foils 40 are shown spaced away from the backing plate 44 at their end portions 46 in order to emphasize the lack of attachment at this end; however they are actually flat against the backing plate 44. Under dynamic load conditions, the developed pressure wedge is able to cause a deflection of individual foils and thereby achieve the same results as achieved with the FIG. 1 embodiment. Additionally, the resilient stiffener 26' is flexible in response to the pressure wedge as may be the support element 30'. The backing plate 44 may be identical to the stiffener 26' and respond to the pressure wedge in an analogous manner. Initiation of the deflection is caused by a deflection depression zone 48 situated between two closely spaced and adjacent resilient bearing foils 40.

Figure 3:
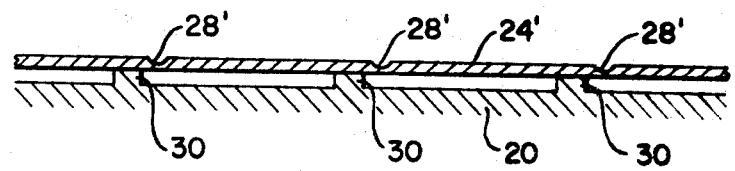
FIG. 3 is a diagrammatic view of another arrangement in accordance with the invention similar to that of FIG. 1.

FIG. 3 illustrates a bearing element 24' in position on support elements 30 of a base structure 20 in an assembly similar to the bearing 10 of FIG. 1 (movable element 22 is omitted for simplicity). The bearing element 24' with its deflection depressions or triggering notches 28' is similar to the element 24 with its notches 28 of FIG. 1 except that it is fabricated, through control of dimensions and material to provide a controlled bearing stiffness. In such a structure as shown in FIG. 3, the separate stiffeners such as 26 may be dispensed with since their function is incorporated in the bearing element 24'. The base structure 20 with its spaced support elements 30 provides support for the bearing while permitting deformation under dynamic load conditions, the triggering notches 28' serving to initiate deflection of the bearing element 24' in the manner illustrated in FIG. 4.

Figure 4:
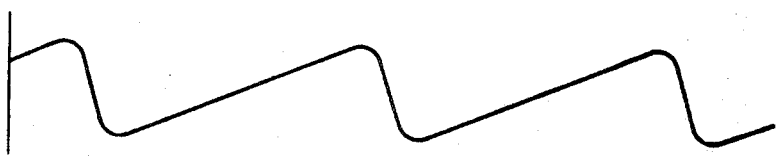
FIG. 4 is a graphic illustration of an exaggerated pressure profile corresponding to the bearing embodiment shown in FIGS. 1-3 for illustrating the pressure distribution within the bearing unit under dynamic conditions.

FIG. 4 illustrates an exaggerated pressure profile (where the ordinate represents increasing pressure in an upward direction and the abscissa represents distance corresponding to the FIG. 2 embodiment at some instant in time) under dynamic conditions of a bearing having the configuration shown in FIG. 2. It is noted that the pressure is a minimum at points corresponding to the location of the deflection depressions 48.

Figure 5:
FIG. 5 is a graphic illustration of a bearing deformation profile corresponding to the arrangements of FIGS. 1-3 and illustrates in exaggerated form the deformation of the invention embodiments when subjected to the pressure profile of FIG. 4.

FIG. 5 illustrates the deflection of the resilient bearing foils 40 and associated elements 44 and 26 (the ordinate represents bearing foil deflection relative to a reference position while the abscissa represents distance along the FIG. 2 embodiment) in response to the pressure profile illustrated in FIG. 3.

FIGS. 4 and 5 are merely illustrative of a bearing operating under specific dynamic load conditions. Other pressure and deflection profiles may be found, even in the same bearing, as dynamic conditions vary.

Figure 6:
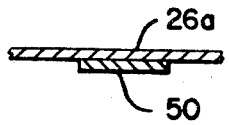
FIG. 6 is a diagrammatic view of one particular type of support element which may be used in arrangements in accordance with the invention.
Figure 7:
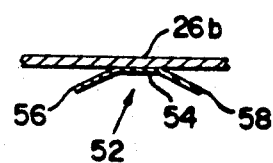
FIG. 7 is a diagrammatic view of another particular type of support element which may be used in place of the element of FIG. 6.

FIGS. 6 and 7 illustrate particular alternative support element configurations which may be employed in arrangements in accordance with the invention. FIG. 6 shows in cross-sectional detail a particular support element having a bearing stiffener 26a mounted on a relatively flat pad 50 which may be rigid in structure. A rigid flat pad may be desirable under the conditions where axial motion of the movable element must be kept to a minimum or where thermal conduction to the stationary element must be maximized. Also where maximum load capacity is not required, the configuration of FIG. 6 provides a less expensive design than that of FIG. 7.

FIG. 7 shows another arrangement of a support element in the form of a bearing stiffener 26b to which is affixed a spring type of support element 52. As illustrated in cross section, the support element 52 has a horizontal base portion 54 which may be affixed by any suitable means such as spot welding to the stiffener 26b. Connected to the base portion 54 are two diverging legs 56 and 58 which, when placed together against a stationary mounting element, will flex about the base portion 54 so as to provide additional flexibility in the vertical direction as viewed in FIG. 6. This configuration is good for adjusting to misalignments and thermal distortions of the movable element.

Figure 8:
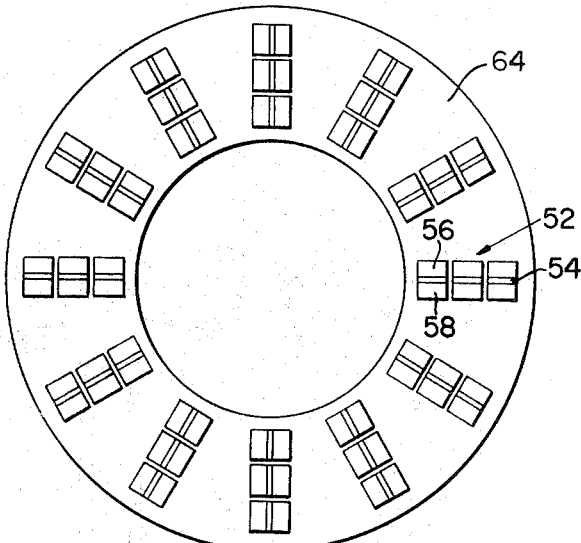
FIG. 8 is a plan view showing a plurality of support elements of FIG. 7 mounted to a backing plate for use in a thrust-type bearing in accordance with the invention.

FIG. 8 shows a plan view of a support member 64 including a plurality of individual spring supports 52 of the type shown in FIG. 7 as arranged for use in a thrust-type hydrodynamic fluid bearing. In FIG. 8 the member 62 is shown comprising a backing plate or stiffener with 12 attached and equally spaced support elements 52, each of the support elements having a base portion 54 and two leg portions 56, 58. It is to be noted that each of the support elements is segmented into three portions along its longitudinal dimension (radially) for the purpose of allowing greater flexibility along that dimension; that is, the outer two segments may flex differently depending upon the pressure at each of the locations at any one time. In one preferred embodiment utilizing a support of this type, the inner tips of the spring legs 56, 58 are spotwelded to the back of plate 64 to reduce spring stiffness at the smaller radius.

Figure 9:
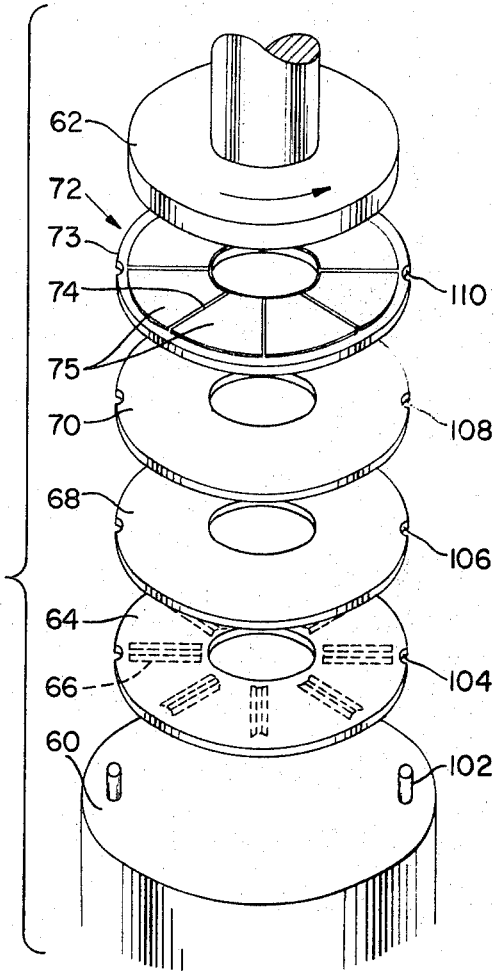
FIG. 9 is a partially exploded diagrammatic view of one particular arrangement in accordance with the invention as embodied in a thrust-type bearing.

FIG. 9 illustrates in a partially exploded diagrammatic view a thrust bearing having a stationary element 60 and a movable or rotatable element 62. A support member 64 similar to that of FIG. 8 is shown adjacent the stationary element 60 and, while shown with resilient supports 66 (similar to those shown in FIGS. 7 and 8) next to the element 60, it may be positioned with its other side up if desired. The spring supports 66 are similar to the supports 52 of FIG. 8 except that they are not radially segmented. Next to the support member 64 are two additional bearing stiffening shims 68 and 70, provided to control the response of the system to deflection under dynamic conditions. Positioned between the upper stiffening shim 70 and the thrust runner 62 is a resilient foil assembly 72 comprising a single disk 73 having a number of spaced deflection depressions 74 between adjacent foils such as 75. Operation is analogous to that explained for the FIG. 2 embodiment. Alignment pins 102 are affixed to the stationary element 60 to engage alignment notches 104, 106, 108 and 110 in the elements 64, 68, 70 and 72 respectively to maintain these elements fixed in position against rotation.

Figure 10:
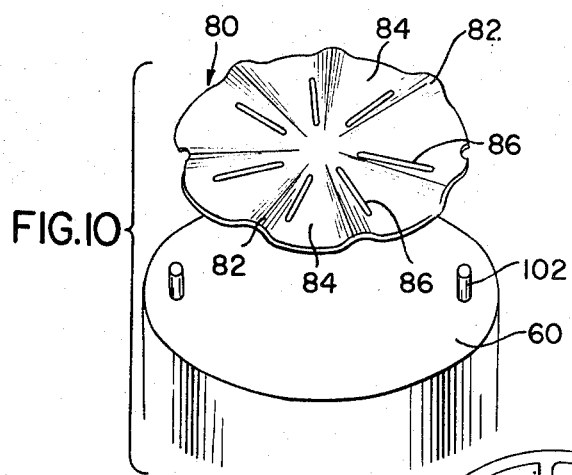
FIG. 10 is a view corresponding to a portion of FIG. 9 illustrating an alternative type of support element for use in arrangements in accordance with the invention.

FIG. 10 illustrates an alternative embodiment of a support element for a thrust-type bearing which may be substituted for the support member 64 of FIG. 9. The support element of FIG. 10 is comprised of a thin disk 80 which is purposely deformed to develop a series of paired raised portions 82 and valley portions 84. Located between each pair of raised and valley portions is a series of slots 86. The support element 80 shown may function in a manner analogous to the stiffener element 64 and support elements 66 of the FIG. 9 embodiment where the raised portions 82 are positioned to correspond to the support elements 66. The particular shape and formation of the element as shown in FIG. 10 is for illustration only as it is clear that various other similar shapes can be designed to perform more or less in a similar manner depending upon the expected operating condition.

Figure 11:
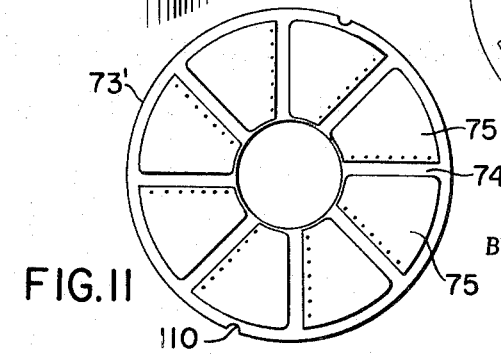
FIG. 11 is a top view of a unitary bearing assembly in accordance with the invention which may be substituted for the plurality of bearing elements in the thrust bearing of FIG. 9.
Figure 12:
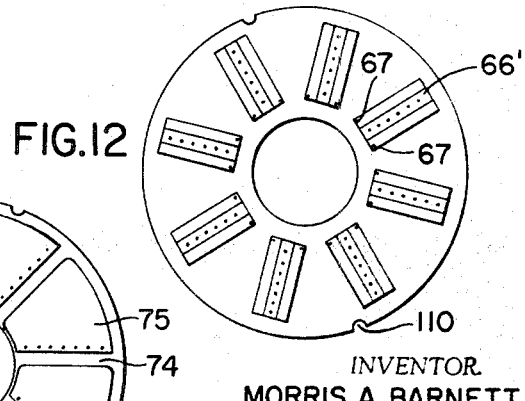
FIG. 12 is a view of the underside of the bearing assembly of FIG. 11.

FIGS. 11 and 12 are front and back views respectively of a unitary bearing and spring support structure which incorporates in one assembly the elements 64, 68, 70 and 72 of FIG. 9. FIGS. 11 and 12 show a plate 73' which is fabricated to develop controlled bearing stiffness for use in a thrust bearing of the general type represented in FIG. 9. On its upper face are affixed a plurality of foils 75, spotwelded to the plate 73' at their leading edges and spaced from each other by depressions 74. On the under side, a plurality of support springs 66' of the type shown in FIG. 7 are affixed by spotwelding along a central portion to the plate 73'. Notches 110 are provided for restraining the assembly against rotation when utilized between a base and thrust runner such as members 60 and 62 respectively of FIG. 9. This assembly advantageously provides in a single unit the various functions of foil positioning, stiffening and variable support, thus simplifying the fabrication of such units. As shown in FIG. 12, the springs 66' are welded at their inner tips 67 to reduce spring stiffness in the vicinity of the smaller radius, thus developing a variation in spring support along a radius of the plate 73'.

FIGS. 13 and 14 illustrate the inventive concept as it is arranged in a journal-type bearing. In these figures, a journal-type bearing is shown comprising a stationary element such as bushing 90 and a rotatable element such as shaft 92. Affixed to the interior of the bushing 90 in the FIG. 13 embodiment are a number of resilient bearing foils 94 and support elements 96. These may be seen more clearly in FIG. 14 which is a sectional view taken along the line 14—14 of FIG. 13. Each foil 94 is maintained against rotation by an anchoring arrangement employing a rod such as 98, to which an associated foil 94 is affixed, recessed in a corresponding slot such as 99. Operation of the FIGS. 13 and 14 embodiment is similar to that described earlier for the FIGS. 1 and 2 embodiments. That is, the support structure which assists in developing the preferred pressure distribution comprises the supports 96 spaced about the interior of the bushing 90 at points relative to the anchoring slots 99 such that the desired deflection of the resilient foils enhances the development of the supporting fluid wedges. Further, the extent and spacing of the foils 94 are such that triggering notches or spaces such as 95 occur at the regions between adjacent foils 94. As described, the notches 95 assist in initiating the shaft supporting fluid wedges within the bearing during startup of the rotating machine.

FIGS. 15 and 16 are also sectional views of a journal-type bearing embodying particular arrangements in accordance with the present invention, but illustrate the details of various arrangements which may be substituted for that which is shown in detail in FIG. 14. FIG. 15 illustrates a continuous cylindrical foil support arrangement within a bushing 90 for supporting a rotatable shaft 92. The cylindrical support structure of FIG. 15 is shown as comprising an interior foil cylinder 120 backed up by a pair of cylinders 122 and 124. Supports 96 are provided about the interior of the bushing 90 as shown in FIG. 14 to assist in controlling the desired pressure distribution for support of the shaft 92. The interior foil cylinder 120 is provided with a plurality of triggering notches 126 which preferably extend the length of the cylinder. These triggering notches 126 serve to assist in the initiation of the fluid wedges within the bearing during initial rotation of the shaft 92.

FIG. 16 depicts another alternative arrangement for the foil support structure for a journal-type fluid foil bearing comprising a single foil 130 anchored as previously described by a rod 98 within a slot 99. As shown, the foil 130 extends almost entirely around the interior of the bushing 90. A slight space 132 is left between the beginning and end of the foil 130 to serve as a triggering notch for initiating the pressure wedge when shaft rotation is started. A plurality of other notches 134 are located about the extent of the foil 130 to cooperate with the space 132 and function in the manner described for triggering the initiation of the pressure wedges during rotation startup. Protrusions 136 are affixed to the interior wall of the bushing 90 to provide the desired support of the foil 130 and, by virtue of the spacing of the protrusions 136 about the interior of the bushing 90, assist in controlling the development of the desired pressure distribution of the self-pressurized fluid within the bearing structure.

It will be noted from a comparison of FIGS. 14, 15 and 16 that the shape of the support elements 96 and 136 is different, being rectangular in cross section in FIGS. 14 and 15 while substantially semicircular in FIG. 16. The profile shape of these elements is not material, insofar as their support function is concerned, and a profile shape may be selected which is relatively easy to machine from the standpoint of the fabrication process.

Individual support elements employed in particular arrangements in accordance with the invention described herein, for example the elements 96 of FIGS. 13–15, are to be located at positions expected to develop a deformation pattern to optimize bearing performance (either to maximize load capacity or minimize friction). It is understood that the peak pressure position (see FIG. 4) may vary with speed. Empirical studies have indicated that optimum positioning of the resilient bearing foils, such as 94 of FIG. 14, and the deflection depressions or triggering notches 95 determined thereby relative to the location of the associated support elements, such as 96 of FIG. 14, materially increases the bearing load capacities of the corresponding bearing. In a thrust-type bearing such as that depicted in FIG. 9 of the drawings, the orientation of the resilient support assembly 72 with its foils 75 and deflection depressions 74 depends upon, among other factors, the dimensions of the support element 66, the type and thickness of the stiffener elements 64, 68 and 70, as well as the size of the bearings, the operating speed and the anticipated load.

Test units have been constructed with stiffener elements such as stiffener element 64 (FIG. 9) having a diameter of 4.5 inches with the support elements 66 being about 0.9 inch long and about 0.3 inch wide. The thickness of stiffener element 64 may be of the order of 0.007 inch while the thickness of the support element 66 is of the order of 0.010 inch. Further, the resilient bearing element 72 may have a diameter of about 4.5 inches and a thickness of about 0.010 inch. The depth of the deflection depressions 74 may be on the order of 0.004 inch.

It is to be understood that various changes in form and detail may be made based upon the teachings disclosed hereinabove without departing from the scope of the invention; for example, the FIG. 2 embodiment may feature resilient bearing foils where the end portions 46 overlap the end portions 42 of the adjacent resilient bearing foils.

Although there have been described above particular arrangements of self-pressurizing bearings with resilient elements in accordance with the invention for the purpose of illustrating the manner in which the invention may be used to advantage, it will be appreciated that the invention is not limited thereto. Accordingly, and and all modifications, variations or equivalent arrangements falling within the scope of the annexed claims should be considered to be a part of the invention.

What is claimed is:

1. A hydrodynamic fluid bearing having resilient bearing elements comprising:

first and second elements movable relative to one another and positioned to form a spacing therebetween;

resilient bearing means disposed within said spacing for deflecting in response to a pressure distribution established by the relative movement of said first and second elements;

said resilient bearing means comprising a plurality of thin foils; and said plurality of thin foils being generally disposed in a common plane and uniformly spaced from one another to provide a succession of spaces between the ends of adjacent foils which are operative to initiate foil deflection under dynamic conditions.

2. A hydrodynamic fluid bearing having resilient bearing elements comprising:

first and second elements movable relative to one another and positioned to form a spacing therebetween;

resilient bearing means disposed within said spacing for deflecting in response to a pressure distribution established by the relative movement of said first and second elements;

said resilient bearing means comprising a unitary thin plate having a plurality of grooves extending into a surface thereof and operative to initiate foil deflection under dynamic conditions; and resilient mounting means disposed between and mounting the resilient bearing means to one of the first and second elements, the resilient mounting means being operative to control the deflection of the resilient bearing means in response to an established pressure distribution and including resilient stiffening means disposed adjacent and generally continuous with said resilient bearing means and support means extending between the resilient stiffening means and said one of the first and second elements.

3. A hydrodynamic fluid bearing of the thrust type comprising:

a stationary element;

an element rotatable relative to the stationary element;

resilient bearing means disposed between the stationary and rotatable elements for deflecting in response to a pressure distribution established by rotation of the rotatable element relative to the stationary element, the resilient bearing means including a plurality of thin foils spaced apart from one another with the spaces between the ends of adjacent foils defining indentations which trigger the establishment of the pressure distribution and the deflection of the resilient bearing means; and resilient mounting means disposed between and mounting the resilient bearing means to the stationary element, the resilient mounting means being operative to control the deflection of the resilient bearing means in response to an established pressure distribution.

4. A bearing as set forth in claim 3 wherein the resilient mounting means includes a circular support member having a plurality of resilient elements mounted on the side of the support member adjacent the stationary element.

5. A bearing as set forth in claim 4 wherein the indentations and the resilient elements are radially disposed relative to the rotatable member.

6. A hydrodynamic fluid bearing having resilient bearing elements comprising:

first and second elements movable relative to one another and positioned to form a spacing therebetween;

resilient bearing means disposed within said spacing for deflecting in response to a pressure distribution established by the relative movement of said first and second elements, the resilient bearing means comprising a plurality of thin foils spaced apart from one another, presenting a common surface area to the first element and including means defining at least one indentation in the common surface area extending into the resilient structure in a direction away from the first element, the indentation comprising the space between the ends trigger the establishment of the pressure distribution and the deflection of the resilient bearing means; and resilient mounting means disposed between and mounting the resilient bearing means to the second element, the resilient mounting means being operative to control the deflection of the resilient bearing means in response to an established pressure distribution.

7. A bearing as set forth in claim 6 wherein each of the thin foils comprises a resilient element affixed at one edge thereof to a common element.

8. A hydrodynamic fluid bearing having resilient bearing elements comprising:

first and second elements movable relative to one another and positioned to form a spacing therebetween;

resilient bearing means disposed within said spacing for deflecting in response to a pressure distribution established by the relative movement of said first and second elements, the resilient bearing means comprising a resilient structure presenting a common surface area to the first element and including means defining at least one indentation in the common surface area extending into the resilient structure in a direction away from the first element, the indentation triggering the establishment of the pressure distribution and the deflection of the resilient bearing means; and resilient mounting means disposed between and mounting the resilient bearing means to the second element, the resilient mounting means being operative to control the deflection of the resilient bearing means in response to an established pressure distribution and including resilient stiffening means disposed adjacent and generally continuous with the resilient bearing means and support means extending between the resilient stiffening means and the second element.

9. A bearing as set forth in claim 8 wherein the support means comprises rigid support elements disposed between the resilient stiffening means and the second element and spaced apart from one another in the direction of relative movement of said first and second elements.

10. A bearing as set forth in claim 8, wherein the resilient stiffening means comprises a laminate of stiffening elements which are generally coextensive with the resilient bearing means.

11. A bearing as set forth in claim 8 wherein the support means comprises resilient support elements which are deflectable in response to forces developed within the bearing.

12. A bearing as set forth in claim 11 wherein the support elements are disposed generally perpendicular to the relative movement of said first and second elements.

13. A bearing as set forth in claim 12 wherein the support elements are elongated and have generally V-shaped cross sections.

14. A bearing as set forth in claim 13 wherein the elongated V-shaped support elements are segmented along their longitudinal axes.

15. A bearing as set forth in claim 8 wherein the support means comprises a thin contoured plate which is resiliently deformable.

16. A bearing as set forth in claim 15 wherein the contoured plate has a plurality of regularly spaced, radially disposed apertures to effect the deformation of the plate under load.

17. A hydrodynamic fluid bearing in accordance with claim 37 wherein the bearing is of the journal type, the first element comprises a bushing having an opening and the second element comprises a rotatable shaft received within the bushing.

18. A bearing as set forth in claim 17 wherein the stiffening means includes a plurality of cylindrical stiffening elements concentrically disposed on the outside of the resilient bearing means.

19. A bearing as set forth in claim 17 wherein the resilient bearing means comprises a cylindrical foil.

20. A bearing as set forth in claim 19 further including a plurality of additional indentations substantially equally spaced along the interior surface of the foil.

21. A bearing as set forth in claim 1 wherein each of the thin foils is affixed to one of the first and second elements along an edge thereof adjacent one of said spaces.

* * * * *

PO-1050
(5/69)

UNITED STATES PATENT OFFICE
CERTIFICATE OF CORRECTION

Patent No. 3,635,534          Dated January 18, 1972

Inventor(s) Morris A. Barnett

It is certified that error appears in the above-identified patent and that said Letters Patent are hereby corrected as shown below:

Column 10, after line 73 and before line 74, insert --of an adjacent pair of the thin foils and being operative to--. Column 12, line 23, "37" should read --8--.

Signed and sealed this 18th day of July 1972.

(SEAL)
Attest:

EDWARD M. FLETCHER, JR.          ROBERT GOTTSCHALK
Attesting Officer                Commissioner of Patents